US012512104B2

(12) United States Patent
Vasilache

(10) Patent No.: US 12,512,104 B2
(45) Date of Patent: Dec. 30, 2025

(54) QUANTIZING SPATIAL AUDIO PARAMETERS

(71) Applicant: NOKIA TECHNOLOGIES OY, Espoo (FI)

(72) Inventor: Adriana Vasilache, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 266 days.

(21) Appl. No.: 18/257,615

(22) PCT Filed: Dec. 15, 2020

(86) PCT No.: PCT/FI2020/050840
§ 371 (c)(1),
(2) Date: Jun. 15, 2023

(87) PCT Pub. No.: WO2022/129672
PCT Pub. Date: Jun. 23, 2022

(65) Prior Publication Data
US 2024/0046939 A1 Feb. 8, 2024

(51) Int. Cl.
*G10L 19/008* (2013.01)
*H04S 3/00* (2006.01)

(52) U.S. Cl.
CPC ............ *G10L 19/008* (2013.01); *H04S 3/008* (2013.01); *H04S 2420/03* (2013.01)

(58) Field of Classification Search
CPC . G10L 19/008; G10L 19/002; G10L 19/0017; G10L 2019/0011; G10L 2019/0012; G10L 19/02; G10L 19/0204; G10L 19/022; G10L 19/03; G10L 19/032; G10L 19/035; G10L 19/038; H04S 2420/03; H04S 2420/07; H04S 3/008
USPC ................................ 381/1–23; 704/500–504
See application file for complete search history.

(56) References Cited

U.S. PATENT DOCUMENTS 12,046,250 B2 7/2024 Vasilache et al.
2003/0026335 A1* 2/2003 Thyagarajan .......... H04N 19/13 375/240.18
2006/0235679 A1 10/2006 Sperschneider et al.
2008/0262852 A1 10/2008 Pang et al.
(Continued)

FOREIGN PATENT DOCUMENTS

CN 106023999 A 10/2016
GB 2577698 A 4/2020
(Continued)

OTHER PUBLICATIONS

Extended European Search Report for European Application No. 20965812.9 dated Jun. 19, 2024, 13 pages.
(Continued)

*Primary Examiner* — Leshui Zhang
(74) *Attorney, Agent, or Firm* — ALSTON & BIRD LLP

(57) ABSTRACT

There is inter alia disclosed an apparatus for spatial audio encoding configured to quantise and index a spatial audio direction parameter to form a quantised spatial audio direction index, wherein the spatial audio direction parameter is associated with a time sub frame of a frequency sub band of an audio frame; and determine a quantised spatial audio difference index by calculating the difference between the quantised spatial audio direction index and a quantised average spatial audio direction index.

8 Claims, 5 Drawing Sheets

(56) References Cited

U.S. PATENT DOCUMENTS

| | | | |
|---|---|---|---|
| 2016/0240206 A1 | 8/2016 | Purnhagen et al. | |
| 2018/0182402 A1 | 6/2018 | Krueger et al. | |
| 2020/0265851 A1* | 8/2020 | Fuchs | G10L 19/032 |
| 2021/0295855 A1 | 9/2021 | Vasilache et al. | |

FOREIGN PATENT DOCUMENTS

| | | | |
|---|---|---|---|
| GB | 2592896 | A | 9/2021 |
| JP | 2011-209741 | A | 10/2011 |
| JP | 2016-540241 | A | 12/2016 |
| JP | 2017-523454 | A | 8/2017 |
| WO | WO 2014/128275 | A1 | 8/2014 |
| WO | WO 2015/059154 | A1 | 4/2015 |
| WO | WO 2017/005978 | A1 | 1/2017 |
| WO | WO 2019/094575 | A1 | 5/2019 |
| WO | WO 2019/097018 | A1 | 5/2019 |
| WO | WO 2019/129350 | A1 | 7/2019 |
| WO | WO 2020/070377 | A1 | 4/2020 |
| WO | WO 2020/089510 | A1 | 5/2020 |
| WO | 2020/193865 | A1 | 10/2020 |
| WO | WO 2021/048468 | A1 | 3/2021 |

OTHER PUBLICATIONS

International Search Report and Written Opinion for Patent Cooperation Treaty Application No. PCT/FI2020/050840 dated Sep. 8, 2021, 22 pages.

Li et al., "The Perceptual Lossless Quantization of Spatial Parameter for 3D Audio Signals", MultiMedia Modeling (MMM 2017), (Dec. 31, 2016), pp. 381-392.

Yang et al., "Multi-channel Object-Based Spatial Parameter Compression Approach for 3D Audio", Advances in Multimedia Information Processing—PCM 2015, (Nov. 22, 2015), pp. 354-364.

Office Action for Japanese Application No. 2023-536510 dated Aug. 8, 2024, 11 pages.

Office Action for Canadian Application No. 3,202,283 dated Oct. 7, 2024, 4 pages.

Office Action for Japanese Application No. 2023-536510 dated Jan. 30, 2025, 2 pages.

Office Action for European Application No. 20965812.9 dated Oct. 21, 2025, 7 pages.

Notice of Reasons for Refusal for Japanese Application No. 2024-226026 dated Oct. 27, 2025, 4 pages.

* cited by examiner

QUANTIZING SPATIAL AUDIO PARAMETERS

CROSS-REFERENCE TO RELATED APPLICATIONS

This application is a national phase entry of International Application No. PCT/FI2020/050840, filed Dec. 15, 2020, the contents of which are hereby incorporated by reference in their entirety.

FIELD

The present application relates to apparatus and methods for sound-field related parameter encoding, but not exclusively for time-frequency domain direction related parameter encoding for an audio encoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and time sub frames an energy ratio parameter in frequency bands (indicating the directionality of the sound) can be also utilized as the spatial metadata (which may also include other parameters such as surround coherence, spread coherence, number of directions, distance, etc.) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field. Furthermore, the analysis of higher-order Ambisonics (HOA) input for multi-direction spatial metadata extraction has also been documented in the scientific literature related to higher-order directional audio coding (HO-DirAC).

A further input for the encoder is also multi-channel loudspeaker input, such as 5.1 or 7.1 channel surround inputs and audio objects.

However, with respect to the components of the spatial metadata the compression and encoding of the spatial audio parameters (such as the spatial audio direction parameters) is of considerable interest in order to minimise the overall number of bits required to represent the spatial audio parameters.

SUMMARY

There is according to a first aspect an apparatus for spatial audio encoding comprising means for: quantising and indexing a spatial audio direction parameter to form a quantised spatial audio direction index, wherein the spatial audio direction parameter is associated with a time sub frame of a frequency sub band of an audio frame; and determining a quantised spatial audio difference index by calculating the difference between the quantised spatial audio direction index and a quantised average spatial audio direction index.

The quantised average spatial audio direction index may be determined by the apparatus having means for: averaging at least two spatial audio direction parameters to provide an average spatial audio direction parameter, wherein the at least two spatial audio direction parameters are associated with consecutive time sub frames of a preceding frequency sub band, wherein the preceding frequency sub band is a lower frequency sub band than the frequency sub band; and quantizing and indexing the average spatial audio direction.

The apparatus may further comprise means for: determining an initial average spatial audio direction parameter for the frequency sub band by: weighting, with a first weight, the average spatial audio direction parameter; weighting, with a second weight, an average spatial audio direction parameter associated with at least two spatial audio direction parameters from an equivalent preceding frequency sub band from a previous audio frame; averaging the first weighted average spatial audio direction parameter and second weighted average spatial audio direction parameter to provide the initial average spatial audio direction parameter for the frequency sub band.

The apparatus may further comprise means for: quantising and indexing a further spatial audio direction parameter to form a quantised further spatial audio direction index, wherein the further spatial audio direction parameter is associated with a proceeding time sub frame of the frequency sub band; and wherein the quantised average spatial audio direction index may be determined by the apparatus having means for: averaging the spatial audio direction parameter and a preceding spatial audio direction parameter for the frequency sub band, wherein the preceding spatial audio direction parameter is associated with a time sub frame preceding the time sub frame associated with the spatial audio direction parameter; and quantising and indexing the average of the spatial audio direction parameter and the preceding spatial audio direction parameter.

The apparatus may further comprise means for: averaging the spatial audio direction parameter and at least one further spatial audio direction parameter, wherein the at least one further spatial audio direction parameter is associated with at least one further time sub frame of the frequency sub band;

determining a variance of the spatial audio direction parameter and the at least one further spatial audio direction parameter; determining a measure as a ratio of the variance to the average of the spatial audio direction parameter and at least one further spatial audio direction parameter; and comparing the measure against a threshold value.

When the measure is less than the threshold value, the apparatus may comprise means for: quantising and indexing the average of the spatial audio direction parameter and the at least one further spatial audio direction parameter to provide the quantised average spatial audio direction index; quantising and indexing the at least one further spatial audio direction parameter to provide the quantised at least one further spatial audio direction index; and determining the quantised at least one further spatial audio difference index by calculating the difference between the quantised at least one further spatial audio direction index and the quantised average spatial audio direction index.

The apparatus may further comprise means for: encoding the quantised further spatial audio direction index, the quantised spatial audio difference index and the quantised average spatial audio direction index using Golomb Rice encoding;

The spatial audio direction parameter may be a spherical coordinate azimuth value.

The means for averaging may comprise the means for: converting spatial audio direction parameters from a spherical domain to cartesian domain parameters; averaging in the cartesian domain parameters; and converting the averaged cartesian domain parameters to the spherical domain.

According to a second aspect there is a method for spatial audio encoding comprising: quantising and indexing a spatial audio direction parameter to form a quantised spatial audio direction index, wherein the spatial audio direction parameter is associated with a time sub frame of a frequency sub band of an audio frame; and determining a quantised spatial audio difference index by calculating the difference between the quantised spatial audio direction index and a quantised average spatial audio direction index.

The quantised average spatial audio direction index may comprise: averaging at least two spatial audio direction parameters to provide an average spatial audio direction parameter, wherein the at least two spatial audio direction parameters are associated with consecutive time sub frames of a preceding frequency sub band, wherein the preceding frequency sub band is a lower frequency sub band than the frequency sub band; and quantizing and indexing the average spatial audio direction.

The method may further comprise: determining an initial average spatial audio direction parameter for the frequency sub band by: weighting, with a first weight, the average spatial audio direction parameter; weighting, with a second weight, an average spatial audio direction parameter associated with at least two spatial audio direction parameters from an equivalent preceding frequency sub band from a previous audio frame; averaging the first weighted average spatial audio direction parameter and second weighted average spatial audio direction parameter to provide the initial average spatial audio direction parameter for the frequency sub band.

The method may further comprise means: quantising and indexing a further spatial audio direction parameter to form a quantised further spatial audio direction index, wherein the further spatial audio direction parameter is associated with a proceeding time sub frame of the frequency sub band; and wherein the quantised average spatial audio direction index may be determined by: averaging the spatial audio direction parameter and a preceding spatial audio direction parameter for the frequency sub band, wherein the preceding spatial audio direction parameter is associated with a time sub frame preceding the time sub frame associated with the spatial audio direction parameter; and quantising and indexing the average of the spatial audio direction parameter and the preceding spatial audio direction parameter.

The method may further comprise: averaging the spatial audio direction parameter and at least one further spatial audio direction parameter, wherein the at least one further spatial audio direction parameter is associated with at least one further time sub frame of the frequency sub band; determining a variance of the spatial audio direction parameter and the at least one further spatial audio direction parameter; determining a measure as a ratio of the variance to the average of the spatial audio direction parameter and at least one further spatial audio direction parameter; and comparing the measure against a threshold value.

When the measure is less than the threshold value, the method may comprise: quantising and indexing the average of the spatial audio direction parameter and the at least one further spatial audio direction parameter to provide the quantised average spatial audio direction index; quantising and indexing the at least one further spatial audio direction parameter to provide the quantised at least one further spatial audio direction index; and determining the quantised at least one further spatial audio difference index by calculating the difference between the quantised at least one further spatial audio direction index and the quantised average spatial audio direction index.

The method may further comprise: encoding the quantised further spatial audio direction index, the quantised spatial audio difference index and the quantised average spatial audio direction index using Golomb Rice encoding;

The spatial audio direction parameter may be a spherical coordinate azimuth value.

The averaging may comprise: converting spatial audio direction parameters from a spherical domain to cartesian domain parameters; averaging in the cartesian domain parameters; and converting the averaged cartesian domain parameters to the spherical domain.

According to a third aspect there is an apparatus for spatial audio encoding comprising at least one processor and at least one memory including computer program code, the at least one memory and the computer program code configured to, with the at least one processor, cause the apparatus to at least to quantise and index a spatial audio direction parameter to form a quantised spatial audio direction index, wherein the spatial audio direction parameter is associated with a time sub frame of a frequency sub band of an audio frame; and determine a quantised spatial audio difference index by calculating the difference between the quantised spatial audio direction index and a quantised average spatial audio direction index.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
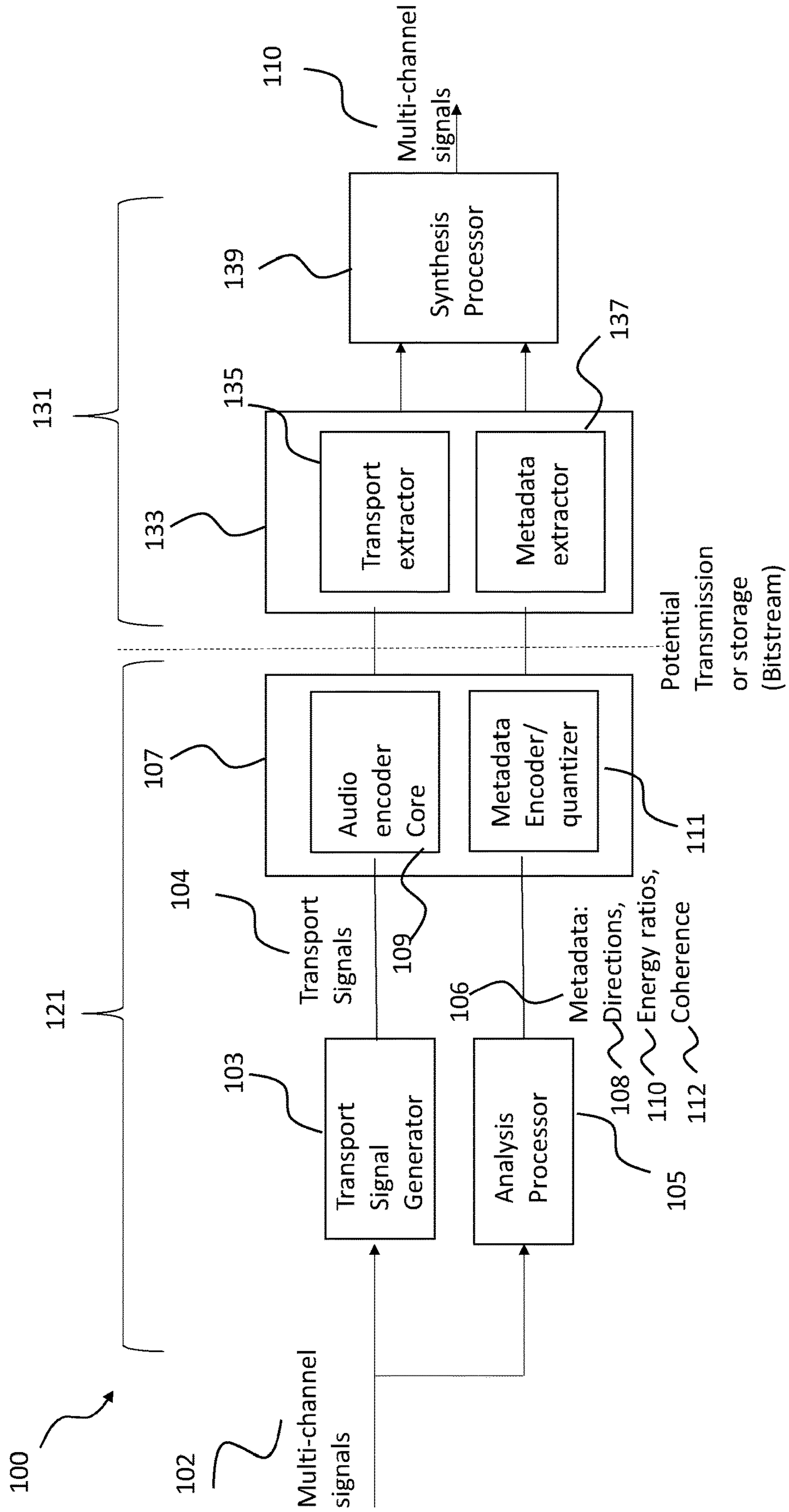
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA), etc. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals. Such a system is currently being standardised by the 3GPP standardization body as the Immersive Voice and Audio Service (IVAS). IVAS is intended to be an extension to the existing 3GPP Enhanced Voice Service (EVS) codec in order to facilitate immersive voice and audio services over existing and future mobile (cellular) and fixed line networks. An application of IVAS may be the provision of immersive voice and audio services over 3GPP fourth generation (4G) and fifth generation (5G) networks. In addition, the IVAS codec as an extension to EVS may be used in store and forward applications in which the audio and speech content is encoded and stored in a file for playback. It is to be appreciated that IVAS may be used in conjunction with other audio and speech coding technologies which have the functionality of coding the samples of audio and speech signals.

The metadata may consist of at least of spherical directions (elevation, azimuth), at least one energy ratio of a resulting direction, a spread coherence, and surround coherence independent of the direction, for each considered time-frequency (TF) block or tile, in other words a time/frequency sub band. In total IVAS may have a number of different types of metadata parameters for each time-frequency (TF) tile. The types of spatial audio parameters which can make up the metadata for IVAS are shown in Table 1 below.

This data may be encoded and transmitted (or stored) by the encoder in order to be able to reconstruct the spatial signal at the decoder.

Moreover, in some instances metadata assisted spatial audio (MASA) may support up to 2 directions for each TF tile which would require the above parameters to be encoded and transmitted for each direction on a per TF tile basis. Thereby potentially doubling the required bit rate according to Table 1 below.

| Field | Bits | Description |
|---|---|---|
| Direction index | 16 | Direction of arrival of the sound at a time-frequency parameter interval. Spherical representation at about 1-degree accuracy. Range of values: "covers all directions at about 1° accuracy" |
| Direct-to-total energy ratio | 8 | Energy ratio for the direction index (i.e., time-frequency subframe). Calculated as energy in direction/total energy. Range of values: [0.0, 1.0] |
| Spread coherence | 8 | Spread of energy for the direction index (i.e., time-frequency subframe). Defines the direction to be reproduced as a point source or coherently around the direction. Range of values: [0.0, 1.0] |
| Diffuse-to-total energy ratio | 8 | Energy ratio of non-directional sound over surrounding directions. Calculated as energy of non-directional sound/total energy. Range of values: [0.0, 1.0] (Parameter is independent of number of directions provided.) |
| Surround coherence | 8 | Coherence of the non-directional sound over the surrounding directions. Range of values: [0.0, 1.0] (Parameter is independent of number of directions provided.) |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) |
| Distance | 8 | Distance of the sound originating from the direction index (i.e., time-frequency subframes) in meters on a logarithmic scale. Range of values: for example, 0 to 100 m. (Feature intended mainly for future extensions, e.g., 6DoF audio.) |

This data may be encoded and transmitted (or stored) by the encoder in order to be able to reconstruct the spatial signal at the decoder.

The bitrate allocated for metadata in a practical immersive audio communications codec may vary greatly. Typical overall operating bitrates of the codec may leave only 2 to 10 kbps for the transmission/storage of spatial metadata. However, some further implementations may allow up to 30 kbps or higher for the transmission/storage of spatial metadata. The encoding of the direction parameters and energy ratio components has been examined before along with the encoding of the coherence data. However, whatever the transmission/storage bit rate assigned for spatial metadata there will always be a need to use as few bits as possible to represent these parameters especially when a TF tile may support multiple directions corresponding to different sound sources in the spatial audio scene.

The concept as discussed hereafter is to quantize, the spatial audio direction parameters (which may comprise the azimuth and elevation values) for the audio frame by processing the spatial audio direction parameters across multiple sub frames for each frequency sub band in turn.

Accordingly, the invention proceeds from the consideration that the bit rate required for transmitting the MASA data (or spatial metadata spatial audio parameters) may be reduced by quantizing the spatial audio direction parameters of an audio frame by using as few bits as possible in order to facilitate transmission and storage of the encoded audio signal.

In this regard, FIG. 1 depicts an example apparatus and system for implementing embodiments of the application.

The system 100 is shown with an 'analysis' part 121 and a 'synthesis' part 131. The 'analysis' part 121 is the part from receiving the multi-channel signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial metadata associated with the audio signals may be provided to an encoder as a separate bit-stream. In some embodiments the spatial metadata may be provided as a set of spatial (direction) index values. These are examples of a metadata-based audio input format.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, direction parameters 108 and energy ratio parameters 110 (comprising a direct-to-total energy ratio per direction and a diffuse-to-total energy ratio) and a coherence parameter 112. The direction, energy ratio and coherence parameters may in some embodiments be considered to be spatial audio parameters. In other words, the spatial audio parameters comprise parameters which aim to characterize the sound-field created/captured by the multi-channel signals (or two or more audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly, the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the metadata.

Therefore, in summary first the system (analysis part) is configured to receive multi-channel audio signals.

Then the system (analysis part) is configured to generate a suitable transport audio signal (for example by selecting or downmixing some of the audio signal channels) and the spatial audio parameters as metadata.

The system is then configured to encode for storage/transmission the transport signal and the metadata.

After this the system may store/transmit the encoded transport signal and metadata.

The system may retrieve/receive the encoded transport signal and metadata.

Then the system is configured to extract the transport signal and metadata from encoded transport signal and metadata parameters, for example demultiplex and decode the encoded transport signal and metadata parameters.

The system (synthesis part) is configured to synthesize an output multi-channel audio signal based on extracted transport audio signals and metadata.

Figure 2:
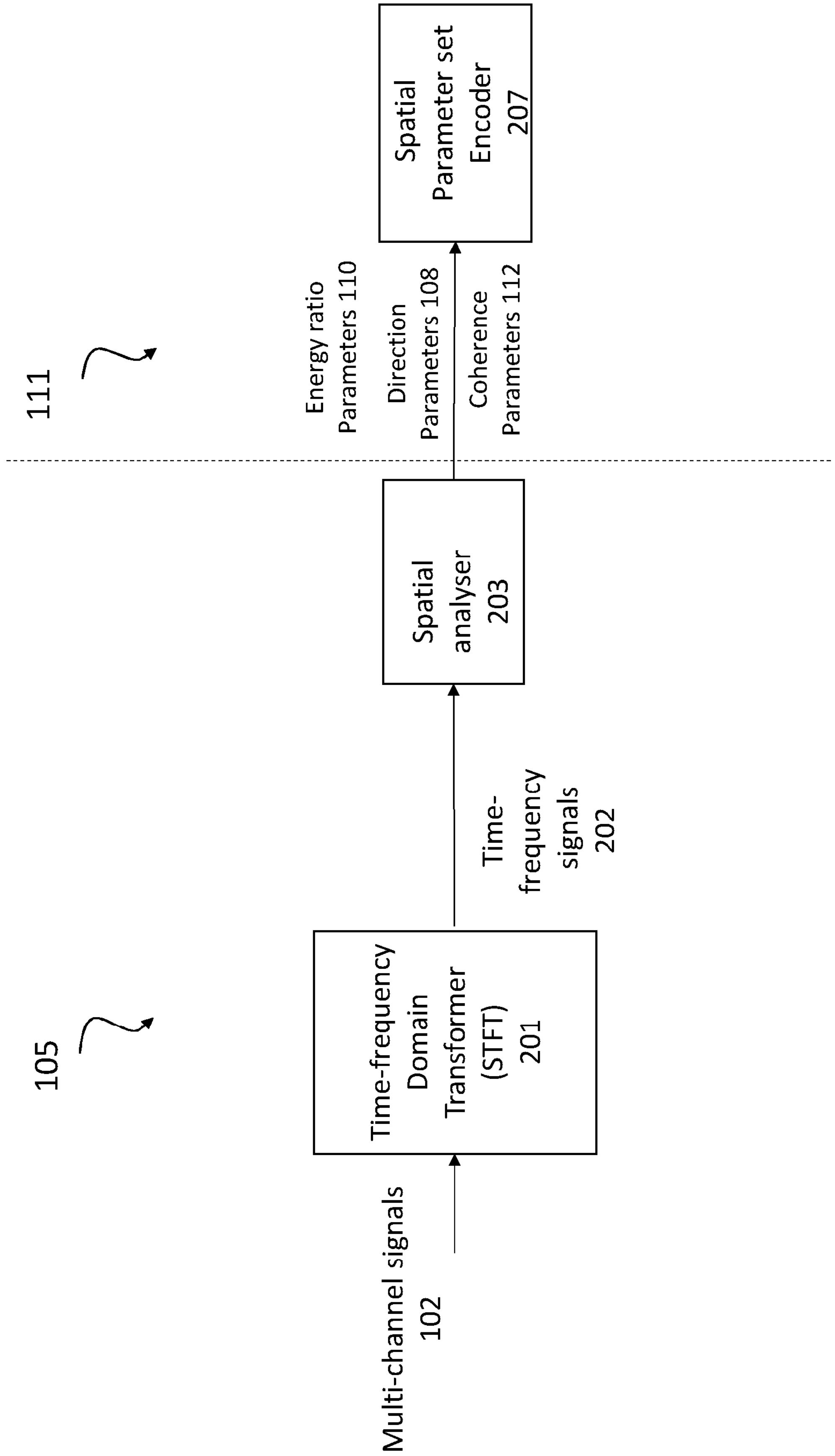
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

FIGS. 1 and 2 depict the Metadata encoder/quantizer 111 and the analysis processor 105 as being coupled together. However, it is to be appreciated that some embodiments may not so tightly couple these two respective processing entities such that the analysis processor 105 can exist on a different device from the Metadata encoder/quantizer 111. Consequently, a device comprising the Metadata encoder/quantizer 111 may be presented with the transport signals and metadata streams for processing and encoding independently from the process of capturing and analysing.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus, for example, the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$. The widths of the sub bands can approximate any suitable distribution. For example, the Equivalent rectangular bandwidth (ERB) scale or the Bark scale.

A time frequency (TF) tile (or block) is thus a specific sub band within a subframe of the frame.

It can be appreciated that the number of bits required to represent the spatial audio parameters may be dependent at least in part on the TF (time-frequency) tile resolution (i.e., the number of TF subframes or tiles). For example, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution. For example, if each TF tile were to be encoded according to the distribution of Table 1 above then each TF tile would require 64 bits (for one sound source direction per TF tile) and 104 bits (for two sound source directions per TF tile, taking into account parameters which are independent of the sound source direction).

In embodiments the analysis processor 105 may comprise a spatial analyser 203. The spatial analyser 203 may be configured to receive the time-frequency signals 202 and based on these signals estimate direction parameters 108. The direction parameters may be determined based on any audio based 'direction' determination.

For example, in some embodiments the spatial analyser 203 is configured to estimate the direction of a sound source with two or more signal inputs.

The spatial analyser 203 may thus be configured to provide at least one azimuth and elevation (the spatial audio direction parameters) for each frequency band and temporal time-frequency block within a frame of an audio signal, denoted as azimuth $\phi(k, n)$, and elevation $\theta(k, n)$. The spatial audio direction parameters 108 for the time sub frame may be also be passed to the spatial parameter set encoder 207.

The spatial analyser 203 may also be configured to determine an energy ratio parameters 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In embodiments the direct-to-total energy ratio parameter can be estimated based on the normalized cross-correlation parameter cor'(k,n) between a microphone pair at band k, the value of the cross-correlation parameter lies between −1 and 1. The direct-to-total energy ratio parameter r(k, n) can be determined by comparing the normalized cross-correlation parameter to a diffuse field normalized cross correlation parameter $cor'_D(k,n)$ as $$r(k, n) = \frac{cor'(k, n) - cor'_D(k, n)}{1 - cor'_D(k, n)}.$$

The direct-to-total energy ratio is explained further in PCT publication WO2017/005978 which is incorporated herein by reference. The energy ratio may be passed to the spatial parameter set encoder 207.

The spatial analyser 203 may furthermore be configured to determine a number of coherence parameters 112 which may include surrounding coherence ($\gamma(k, n)$) and spread coherence ($\zeta(k, n)$), both analysed in time-frequency domain.

The term audio source may relate to dominant directions of the propagating sound wave, which may encompass the actual direction of the sound source.

Therefore, for each sub band k there will be collection (or set) of spatial audio parameters associated with the sub band k and sub frame n. In this instance each sub band k and sub frame n (in other words a TF tile) may have the following spatial audio parameters associated with it on a per audio source direction basis; at least one azimuth and elevation denoted as azimuth $\phi(k,n)$, and elevation $\theta(k,n)$, and a spread coherence ($\zeta(k,n)$ and a direct-to-total-energy ratio parameter r(k,n). Obviously if there is more than one direction per TF tile, then the TF tile can have each of the above listed parameters associated with each sound source direction. Additionally, the collection of spatial audio parameters may also comprise a surrounding coherence ($\gamma(k,n)$). Parameters may also comprise a diffuse-to-total energy ratio $r_{diff}(k,n)$.

In embodiments the diffuse-to-total energy ratio $r_{diff}(k, n)$ is the energy ratio of non-directional sound over surrounding directions and there is typically a single diffuse-to-total energy ratio (as well as surrounding coherence ($\gamma(k,n)$) per TF tile. The diffuse-to-total energy ratio may be considered to be the energy ratio remaining once the direct-to-total energy ratios (for each direction) have been subtracted from one. Going forward, the above parameters may be termed a set of spatial audio parameters (or a spatial audio parameter set) for a particular TF tile.

The spatial parameter set encoder 207 can be arranged to quantize direction parameters 108 in addition to the energy ratio parameters 110 and coherence parameters 112.

Quantization of the direction parameters 108 (such as the azimuth ($\varphi(k,n)$ and elevation $\theta(k,n)$) may be based on an arrangement of spheres forming a spherical grid arranged in rings on a 'surface' sphere which are defined by a look up table defined by the determined quantization resolution. In other words, the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. The azimuth $\varphi(k, n)$ and elevation $\theta(k, n)$ direction parameters 108 may then be mapped to points spherical grid uses a vector distance metric in order to provide a quantization index to the spherical grid. Such a spherical quantization scheme may be found in the patent application publications WO2019/091575 and WO2019/129350. Alternatively, the azimuth $\varphi(k, n)$ and elevation $\theta(k, n)$ direction parameters 108 may be quantized according to any suitable linear or non-linear quantization means.

The result of quantizing the azimuth $\varphi(k, n)$ and elevation $\theta(k, n)$ spatial audio direction parameters 108 by the spatial parameter set encoder 207 is therefore at least one azimuth quantization index $I_\varphi(k,n)$ and at least one elevation quantization index $I_\theta(k,n)$ for a TF tile (k,n).

Figure 3:
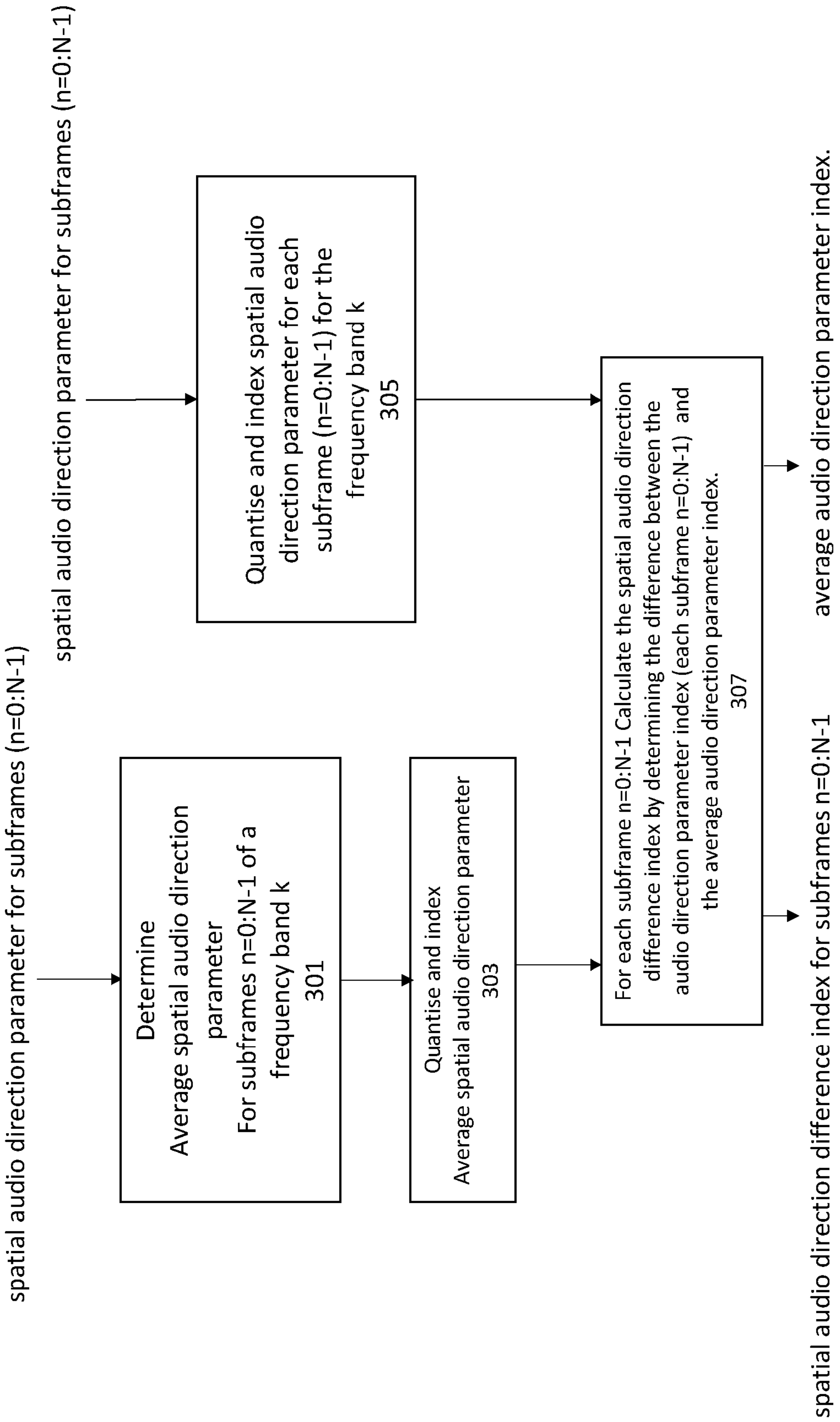
FIG. 3 shows a flow diagram of the operation of the metadata encoder as shown in FIG. 2 according to some embodiments.

FIG. 3 depicts a computer software or hardware implementable process for encoding the spatial audio direction parameters (such as the azimuth and elevation values) for the subframes of a frequency band.

In embodiments the scheme for encoding and quantizing the spatial audio direction parameters 108 may comprise the initial step of finding the average spatial audio parameter across the sub frames (n=0:N−1) of a particular sub band k. In some embodiments this initial step may involve finding the average spatial audio parameter for the sub frames of the first sub band k=0.

In terms of the azimuth $\varphi(k, n)$ and elevation $\theta(k, n)$ direction parameters 108 this step maybe performed by first finding an average azimuth value $Avg\varphi(k)$ across and an average elevation value $Avg\theta(k)$ across the N subframes of a frame also for the sub band k (k=0).

Each average audio directional parameter may can be calculated by initially calculating the average as cartesian coordinates and then converting the average cartesian coordinate to an average spherical coordinate.

In other words, the operation of calculating the average azimuth and elevation values for a sub band k may take the form of having an X axis direction component as $$x(k,n)=r(k,n)\cos\theta(k,n)\cos\varphi(k,n)$$

where average X axis for sub band k is $Avgx(k)=1/N\Sigma_{n=0}^{N-1}x(k,n)$ the Y axis component as $$y(k,n)=r(k,n)\cos\theta(k,n)\sin\varphi(k,n)$$

where average Y axis for the sub band k is $Avgy(k)=1/N\Sigma_{n=0}^{N-1}y(k,n)$ and the Z axis component as $$z(k,n)=r(k,n)\sin\theta(k,n)$$

where average Z axis for the sub band k is $Avgz(k)=1/N\Sigma_{n=0}^{N-1}z(k,n)$ Each cartesian coordinate may be weighted by the respective direct-to-total energy ratio parameter r(k,n) associated with the TF tile.

In other embodiments there may be no weighting performed for each cartesian coordinate.

The average azimuth and elevation values may then by determined by taking the above average cartesian coordinate values for the sub band k and converting them back to the spherical domain.

In embodiments this conversion may be performed using the following expressions;

$$Avg\varphi(k)=\arctan\frac{Avgy(k)}{Avgx(k)}$$

$$Avg\theta(k)=\arctan\frac{Avgz(k)}{\sqrt{Avgx(k)^2+Avgy(k)^2}}$$

The above processing step of determining the average spatial audio direction parameter for the subframes of a frequency band is shown as processing step 301 in FIG. 3.

The average azimuth and elevation values for the sub band k may then be quantized as outlined above to give the quantized indices $I_{avg\varphi}(k)$ and $I_{avg\theta}(k)$, that is the average audio direction index across the sub frames for the sub band k.

The processing step of quantizing and indexing the average spatial audio direction parameter for the subframes of a frequency band is shown as processing step 303 in FIG. 3.

In embodiments the above calculation for the $I_{avg\varphi}(k)$ and $I_{avg\theta}(k)$ may be performed for the first sub band in the frame, i.e. sub band k=0 resulting in $I_{avg\varphi}(0)$ and $I_{avg\theta}(0)$.

The encoding process for the audio direction parameters (as performed by the spatial parameter set encoder 207) may then determine an audio direction difference index for each subframe (n=0:N−1) of the first sub band (k=0). Where the audio direction difference index for the subframe n may take the form of determining the difference between the audio direction quantization index for the subframe n and the average audio direction index (as determined above) for the subframes across the frame. In the case of the azimuth value this routine may take the following form:

For each subframe n 0 to N−1

$$I_{diff\varphi}(0,n)=I_\varphi(0,n)-I_{avg\varphi}(0)$$

The same steps may also be applied to the elevation value as well. That is

For each subframe n 0 to N−1

$$I_{diff\theta}(0,n)=I_\theta(0,n)-I_{avg\theta}(0)$$

The processing step of quantizing and indexing the spatial audio direction parameter for each sub band of a frequency band is shown as processing step 305 in FIG. 3. The above processing step of determining the average spatial audio direction difference index for the subframes of a frequency band is shown as processing step 307 in FIG. 3.

In some embodiments the encoding process for the audio direction parameters of the first sub band may also comprise a further processing step (not shown in FIG. 3) whereby the audio direction difference indexes for the sub band (k=0) are processed such that all values are positive.

In these embodiments the processing of the audio direction difference indexes to a series of positive values may be performed by the following C-code.

```
for (i = 0; i < len; i++)
  {
    if (dif_idx[i] < 0)
```

-continued

```
    {
      dif_idx[i] = -2 * dif_idx[i];
    }
    else if (dif_idx[i] > 0)
    {
      dif_idx[i] = dif_idx[i] * 2 - 1;
    }
    else
    {
      dif_idx[i] = 0;
    }
  }
```

The series of audio direction difference indexes may then be rearranged into either an ascending or descending order of magnitude in order to facilitate entropy based encoding (of the audio direction difference indexes across the sub frames of the first frequency band.)

These processing steps for the audio direction difference indexes may be performed individually for the azimuth and/or elevation parameters $I_{diff\varphi}(0,n)$, $I_{diff\theta}(0$, n=0:N−1 for a sub band k, in this case the first sub band k=0.

As mentioned above the rearranged audio direction difference indexes for the subframes of the first frequency sub band may be encoded using an entropy encoding, such as the Golomb Rice encoding. This encoding may be dependent on the number of bits available for the encoding of the audio directions for the frame.

Other sub bands (for example the sub bands k=1:K−1) may take a different approach to the encoding of the audio direction parameters across the respective sub band. For the sake of brevity going forward the sub band over which these calculations can be performed will be denoted as a sub band k (where k≠0).

Figure 4:
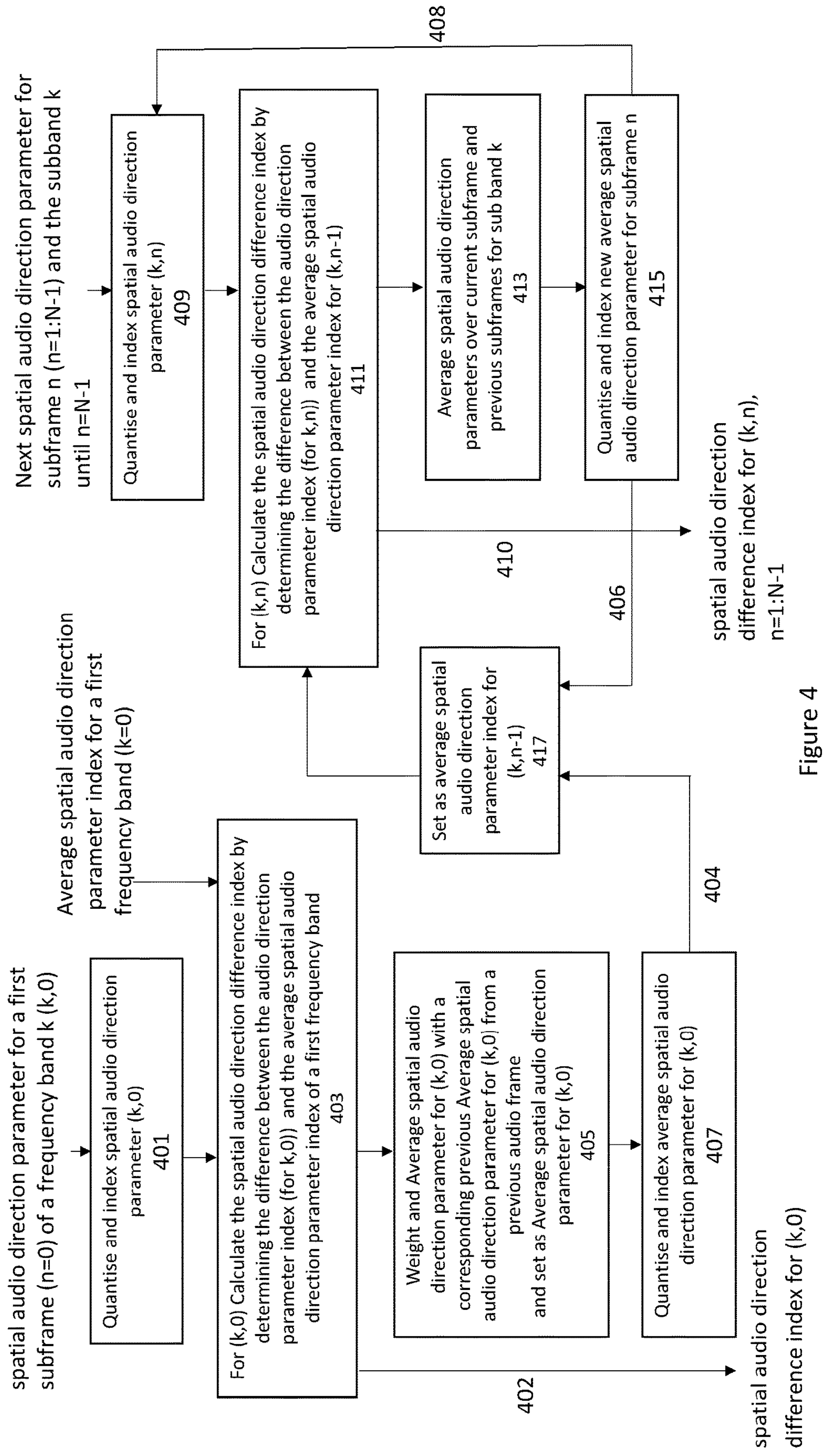
FIG. 4 shows a further flow diagram of the operation of the metadata encoder as shown FIG. 2 according to some embodiment.

FIG. 4 depicts a computer software or hardware implementable process for encoding the spatial audio direction parameters (such as the azimuth and elevation values) for subframes of a frequency band which is not the first frequency band in an audio frame.

The approach initially involves taking the spatial audio parameter average index for sub band k=0, $I_{avg\varphi}(0)$ and $I_{avg\theta}(0)$ as determined by processing step 303 FIG. 3, and using this value to determine the spatial audio parameter direction difference index between the first subframe (for sub band k≠0) and the average index for sub band k=0. In other words the spatial audio direction difference indexes $I_{diff\varphi}(k,0)$, $I_{diff\theta}(k,0)$ may be found by determining $I_{diff\theta}(k,0)=I_\theta(k,0)-I_{avg\theta}(0)$ and $I_{diff\varphi}(k,0)=I_\varphi(k,0)-I_{avg\varphi}(0)$ for the azimuth and elevation values respectively.

Where $I_\theta(k,0)$ and $I_\varphi(k,0)$ are the quantization index for the azimuth and elevation values for the first sub frame of the kth frequency band.

With respect to FIG. 4, step 401 depicts this processing step of quantizing and indexing the spatial audio direction parameters for the first subframe of the sub band k, where k is not the first sub band in the audio frame. Furthermore, processing step 403 depicts the step of determining the spatial audio direction difference index ($I_{diff\varphi}(k,0)$, $I_{diff\theta}(k,0)$) corresponding to the spatial audio direction parameters for the first subframe of the sub band k.

Following on from this step the average spatial audio direction parameter for this first sub frame (n=0) may be initiated to be the value of the actual spatial audio direction parameter for the sub frame (n=0). In terms of the azimuth and elevation values this may be expressed as $Avg\varphi(k,0)=\varphi(k,0)$ and $Avg\theta(k,0)=\theta(k,0)$. The average spatial audio direction parameter for this first sub frame (n=0) may then be quantised to give the spatial audio direction parameter average index for the first sub frame in terms of the terms of the azimuth and elevation values this may be expressed as $I_{avg\varphi}(k,0)$ and $I_{avg\theta}(k,0)$.

In some embodiments the average spatial audio direction parameter for this first sub frame (n=0) may be averaged with the corresponding average spatial audio direction parameter from the previous audio frame. This may be performed as a weighted average in which weighting in in the favour of the average spatial audio direction parameter from the current audio frame. In this instance a weighting w (of less than 0.5) may be applied to the average spatial audio direction parameter from the previous audio frame and a weighting of 1-w may be applied to the average spatial audio direction parameter from the current frame. In embodiments, the averaging operation may be performed in the cartesian coordinate domain as outlined above.

The step of determining the average spatial audio direction parameter for the for the first subframe of the sub band k is shown as the processing step 405 in FIG. 4. The step of quantising and indexing the average spatial audio direction parameter for the for the first subframe of the sub band k is shown as processing step 407 in FIG. 4.

Also shown in FIG. 4, is the path 402 depicting the spatial audio direction difference index for the first subframe of the kth sub band as an output from the spatial audio direction encoding process.

Following on from this step the average spatial audio parameter index for the first sub frame (n=0) (for the sub band k≠0) may be used in the determination of a spatial audio parameter direction difference index for a further sub frame (n=1) within the same sub band k. This step is depicted by the path 404. Processing step 417 depicts that the average spatial audio parameter index for the first sub frame (n=0) is set for use as the average spatial audio parameter index for the next subsequent sub frame (n=1).

The processing for a further sub frame (n=1 in this instance) may take the form of the following steps:

1. Determine the spatial audio parameter direction difference index. In other words the spatial audio direction difference indexes $I_{diff\varphi}(k,1)$, $I_{diff\theta}(k,1)$ may be found by determining $I_{diff\theta}(k,1)=I_\theta(k,1)-I_{avg\theta}(k,0)$ and $I_{diff\varphi}(k,1)=I_\varphi(k,1)-I_{avg\varphi}(k,0)$. Where $I_\theta(k,1)$ and $I_\varphi(k,1)$ are the quantization indexes for the azimuth and elevation value for the second sub frame of the kth frequency band respectively. With respect to FIG. 4 this step is represented by the processing steps of 409 and 411.
2. The average spatial audio direction parameter may then be determined for the further sub frame (n=1) by calculating the average of the actual spatial audio direction parameter for the sub frame (n=1) and the actual spatial audio direction parameter for a previous sub frame (n=0). In terms of the azimuth and elevation values this may be expressed as $Avg\varphi(k,1)=(\varphi(k,1)+\varphi(k,0))/2$ and $Avg\theta(k,0)=(\theta(k,1)+\theta(k,0))/2$. In embodiments, the averaging operation may be performed in the cartesian coordinate domain as outlined above. With respect to FIG. 4 this step is represented by the processing step 413.
3. The average spatial audio direction parameter for the further sub frame (n=1) may then be quantised to give the spatial audio direction parameter average index for the further sub frame (n=1). In terms of the terms of the azimuth and elevation values this may be expressed as $I_{avg\varphi}(k,1)$ and $I_{avg\theta}(k,1)$. With respect to FIG. 4, quantisation and indexing of the average spatial audio direction parameter is shown as the processing step 415

The spatial audio parameter average index for the further sub frame (n=1) (for the sub band k≠0) may then be used in the determination of a spatial audio parameter direction difference index for a yet further sub frame (n=2) within the same sub band k. This step is shown in FIG. 4 as the path 406 coupled with the processing step 417.

The processing steps 1 to 3 may then be repeated for the yet further sub frame (n=2, for instance). Such that:

1(2). The spatial audio parameter direction difference index for the yet further sub frame may be determined by determining $I_{diff\theta}(k,2)=I_{\theta}(k,2)-I_{avg\theta}(k,1)$ and $I_{diff\varphi}(k,2)=I_{\varphi}(k,2)-I_{avg\varphi}(k,1)$. Where $I_{\theta}(k,2)$ and $I_{\varphi}(k,2)$ are the quantization indexes for the azimuth and elevation value for the third sub frame of the kth frequency band respectively.

2(2). The average spatial audio direction parameter may then be determined for the yet further sub frame (n=2) by calculating the average of the actual spatial audio direction parameter for the sub frames (n=2) and the actual spatial audio direction parameter for the previous sub frames (n=0,1). In terms of the azimuth and elevation values this may be expressed as $Avg\varphi(k,2)=(\varphi(k,2)+(\varphi(k,1)+(\varphi(k,0))/3$ and $Avg\theta(k,2)=(\theta(k,2)+\theta(k,1)+\theta(k,0))/3$. In embodiments, the averaging operation may be performed in the cartesian coordinate domain as described previously.

3(2). The average spatial audio direction parameter for the yet further sub frame (n=2) may then be quantised to give the spatial audio direction parameter average index for the yet further sub frame (n=2). In terms of the terms of the azimuth and elevation values this may be expressed as $I_{avg\varphi}(k,2)$ and $I_{avg\theta}(k,2)$. The spatial audio parameter average index for the further sub frame (n=2) (for the sub band k≠0) may then be used in the determination of a spatial audio parameter direction difference index for a yet further sub frame (n=3) within the same sub band k.

It is to be appreciated that steps 1, 2 and 3 may be repeated until spatial audio parameter direction difference indexes have been determined for all subframes within the frequency band k (where k≠0). The process of repeating the above steps for further sub frame within a frequency sub band k is depicted in FIG. 4 by the return path 408.

Once the spatial audio parameter direction difference indexes have been determined for at least some (or all) sub frames of the frequency band k, the spatial audio parameter direction difference indexes may be processed such that all values are positive using the C-code above (not shown in FIG. 4). The series of audio direction difference indexes may then be rearranged into either an ascending or descending order of magnitude in order to facilitate entropy-based encoding (of the audio direction difference indices across the sub frames of the kth frequency band.)

The output spatial audio direction difference index for each processed subframe is depicted in FIG. 4 as the path 410.

In embodiments the spatial audio parameter direction difference indexes associated with the sub frames of a sub band may be encoded using Golomb Rice encoding. So in terms of the azimuth and elevation values, the azimuth difference indexes for the sub frames of a sub band may be encoded according to Golomb Rice encoding, and the elevation difference indexes for the sub frames of a sub band may also be encoded according to Golomb Rice encoding. The Golomb encoding of the azimuth difference indexes and the elevation difference indexes may each be performed for each sub band of the audio frame.

In addition, the average spatial audio parameter index value of the first sub band (k=0) may also be Golomb Rice encoded. For instance, the $I_{avg\theta}(0)$ and $I_{avg\varphi}(0)$ may also be Golomb Rice encoded.

Therefore it is to be appreciated that the encoded spatial audio parameter stream on a per audio frame basis may comprise: entropy encoded the average spatial audio parameter index value of the first sub band (k=0), for instance the Golomb Rice encoded $I_{avg\theta}(0)$ and $I_{avg\varphi}(0)$; and entropy encoded spatial audio parameter direction difference indexes associated with the sub frames of each sub band of the audio frame. For instance, the Golomb Rice encoded elevation and azimuth difference indexes $I_{diff\varphi}(k,n)$, $I_{diff\theta}(k,n)$ for k=0:M−1 and n=0:N−1.

It is to be appreciated that the above encoding steps for the spatial audio direction parameters as outlined by FIGS. 3 and 4 may be performed for either the azimuth values within the audio frame or the elevation values within the audio frame or both the azimuth and elevation values within the frame.

The above steps for encoding the spatial audio direction parameters as encapsulated by FIG. 3 may be referred to as a fixed average encoding method for encoding the spatial audio direction parameters. The above steps for encoding the spatial audio direction parameters as encapsulated by FIG. 4 may be referred to as an adaptive average encoding method for encoding the spatial audio direction parameters. As such the method steps as encapsulated from FIG. 3 (the fixed average encoding method) may be deployed as a standalone method. Additionally, the method steps of FIG. 4 (the adaptive average encoding method) for encoding the spatial audio direction parameters may also be configured to encode the spatial audio direction parameters for the subframes of a sub band as a standalone method. In such instances the average spatial audio direction parameter index used as input to FIG. 4 may be derived as an average of at least spatial audio direction parameters of sub frames from a preceding frequency sub band.

In some embodiments the method used to encode the spatial audio parameters of for the sub frames of a frequency sub band may be selected between the fixed average encoding method or the adaptive average coding method. The criteria by which the one of the two methods (fixed average or adaptive average) can be selected may be dependent on the variance of the average azimuth value per subband. The measure by which the selection is made may be based on the ratio of the variance of the spatial audio direction parameters across the sub frames of the sub band to the average of the spatial audio direction parameters for the audio frame. This measure may then be compared to a threshold whereby if the calculated measure is less than the threshold value then the fixed average method may be used to encode the spatial audio direction parameters associated with the sub frames of the frequency sub band. Conversely if the calculated measure is equal to or above the threshold then the adaptive average method may be used to encode the spatial audio direction parameters associated with the sub frames of the frequency sub band.

The above method of encoding the spatial audio direction parameters of an audio frame as described above and laid out in FIGS. 3 and 4 may be incorporated into a more general encoding framework encompassing a number of different spatial audio direction parameter encoding mechanisms. The choice of encoding mechanism (for the encoding of the spatial audio direction parameters of the audio frame) may be determined on an audio frame basis and may be dependent on the allocation of bits for the purpose.

A general framework may have the following pseudo code structure.

Inputs to the general framework may comprise: quantized spatial audio directional parameters (azimuth and elevation); and allowed number of bits (bits_allowed).

```
1. Use process EC1 for encoding the parameter
if bits_EC1 < bits_allowed
  a. Encode quantized direction parameters by method EC1
2. Else
  a. Use bandwise encoding EC2 (with a potential quantization resolution
     decrease)
  b. If bits_EC2 < bits_allowed
     i. Encode using EC2
  c. Else
     i. Reduce quantization resolution
    ii. Use EC3
  d. End if
3. End if
```

Where EC1 refers to the method of encoding the spatial audio directional parameters using difference indexes as outlined above and laid out in FIGS. 3 and 4. The methods EC2 and EC3 can refer to different methods for encoding the spatial audio direction parameters. For instance, EC2 may refer to the method of encoding azimuth and elevation values as described in the WO patent application number PCT/FI2020/050578 and EC3 may refer to the method of encoding azimuth and elevation values as described in the WO patent application published as WO/2020/070377.

The metadata encoder/quantizer 111 may also comprise an energy ratio parameter encoder which may be configured to receive the energy ratio parameter(s) for each TF tile and perform a suitable compression and encoding scheme.

Similarly, the metadata encoder/quantizer 111 may also comprise a coherence encoder which is configured to receive the surround coherence values $\gamma$ and spread coherence values $\zeta$ and determine a suitable encoding for compressing the surround and spread coherence values.

The encoded direction, energy ratios and coherence values may be passed to a combiner. The combiner may be configured to receive the encoded (or quantized/compressed) directional parameters, energy ratio parameters and coherence parameters and combine these to generate a suitable output (for example a metadata bit stream which may be combined with the transport signal or be separately transmitted or stored from the transport signal).

In some embodiments the encoded datastream is passed to the decoder/demultiplexer 133. The decoder/demultiplexer 133 demultiplexes the encoded the quantized spatial audio parameter sets for the frame and passes them to the metadata extractor 137 and also the decoder/demultiplexer 133 may in some embodiments extract the transport audio signals to the transport extractor for decoding and extracting.

The decoded spatial audio parameters may then form the decoded metadata output from the metadata extractor 137 and passed to the synthesis processor 139 in order to form the multi-channel signals 110.

Figure 5:
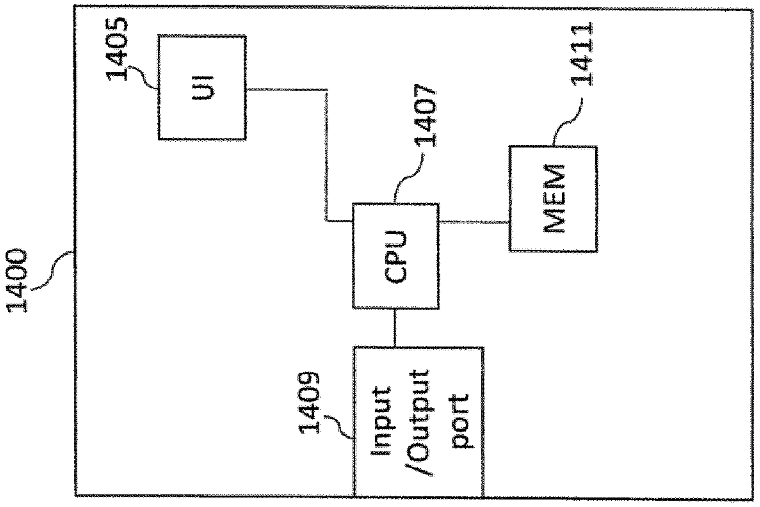
FIG. 5 shows schematically an example device suitable for implementing the apparatus shown.

With respect to FIG. 5 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for spatial audio encoding comprising at least one processor and at least one memory including computer program code, the at least one memory and the computer program code configured to, with the at least one processor, cause the apparatus at least to:

quantize and index an azimuth value of a first time sub frame of a frequency sub band of an audio frame to give a quantized azimuth index for the first time sub frame;

determine a quantised azimuth difference index for the first time sub frame by calculating a difference between the quantised azimuth index for the first time sub frame and a quantised average azimuth index of a previous frequency sub band of the audio frame;

determine an average azimuth value for the first time sub frame by weighting and averaging an average azimuth value for a corresponding frequency sub band of a previous audio frame with the azimuth value of the first time sub frame;

quantise and index the average azimuth value for the first time sub frame to give a quantised average azimuth index for use in a second time sub frame of the frequency sub band;

quantise and index an azimuth value of the second time sub frame to give a quantised azimuth index for the second time sub frame;

determine a quantised azimuth difference index for the second time sub frame by calculating a difference between the quantised azimuth index for the second time sub frame and the quantised average azimuth index for use in the second time sub frame;

determine an average azimuth value for the second time sub frame by averaging the azimuth value of the first time sub frame and the azimuth value of the second time sub frame; and quantise and index the average azimuth value for the second time sub frame to give a quantised average azimuth index for use in a third time sub frame of the frequency band.

2. The apparatus as claimed in claim 1, wherein the apparatus caused to weight and average an average azimuth value for a corresponding frequency sub band of a previous audio frame with the azimuth value for the first time sub frame is caused to:

weight, with a first weight, the average azimuth value for the corresponding frequency sub band of the previous audio frame;

weight, with a second weight, the average azimuth value for the first time sub frame; and average the first weighted average azimuth value for the corresponding frequency sub band of the previous audio frame and the second weighted azimuth value for the first time sub frame to give the average azimuth value for the first time sub frame.

3. The apparatus as claimed in claim 1, wherein the apparatus is further caused to:

encode the quantised azimuth difference indexes for the first and second time sub frames of the frequency sub band of the audio frame and the quantised average azimuth index for a first frequency sub band of the audio frame using Golomb Rice encoding.

4. The apparatus as claimed in claim 1, wherein the apparatus being caused to average azimuth values to provide an average azimuth values is caused to:

convert the azimuth values from a spherical domain to cartesian domain parameters;

average the cartesian domain parameters to give averaged catresian domain parameters; and convert the averaged cartesian domain parameters to the spherical domain.

5. A method for spatial audio encoding comprising:

quantising and indexing an azimuth value of a first time sub frame of a frequency sub band of an audio frame to give a quantized azimuth index for the first time sub frame;

determining a quantised azimuth difference index for the first time sub frame by calculating a difference between the quantised azimuth index for the first time sub frame and a quantised average azimuth index of a previous frequency sub band of the audio frame;

determining an average azimuth value for the first time sub frame by weighting and averaging an average azimuth value for a corresponding frequency sub band of a previous audio frame with the azimuth value of the first time sub frame;

quantising and indexing the average azimuth value for the first time sub frame to give a quantised average azimuth index for use in a second time sub frame of the frequency sub band;

quantising and indexing an azimuth value of the second time sub frame to give a quantised azimuth index for the second time sub frame;

determining a quantised azimuth difference index for the second time sub frame by calculating a difference between the quantised azimuth index for the second time sub frame and the quantised average azimuth index for use in the second time sub frame;

determining an average azimuth value for the second time sub frame by averaging the azimuth value of the first time sub frame and the azimuth value of the second time sub frame; and quantising and indexing the average azimuth value for the second time sub frame to give a quantised average azimuth index for use in a third time sub frame of the frequency band.

6. The method as claimed in claim 5, wherein weighting and averaging an average azimuth value for a corresponding frequency sub band of a previous audio frame with the azimuth value for the first time sub frame comprises the method further comprises:

weighting, with a first weight, the average azimuth value for the corresponding frequency sub band of the previous audio;

weighting, with a second weight, the azimuth value for the first time sub frame; and averaging the first weighted average azimuth value for the corresponding frequency sub band of the previous audio frame and the second weighted azimuth value for the first time sub frame to give the average azimuth value for the first time sub frame.

7. The method as claimed in claim 5, further comprising:

encoding the quantised azimuth difference indexes for the first and second time sub frames of the frequency sub band of the audio frame and the quantised average azimuth index for a first frequency sub band of the audio frame using Golomb Rice encoding.

8. The method as claimed in claim 5, wherein averaging azimuth values to provide an average azimuth value comprises:

converting the azimuth values from a spherical domain to cartesian domain parameters;

averaging the cartesian domain parameters to give averaged cartesian domain parameters; and converting the average the cartesian domain parameters to the spherical domain.

* * * * *